July 7, 1953
G. L. CUNNINGHAM
2,644,748
SULFITE WASTE TREATMENT PROCESS
Filed Nov. 4, 1946
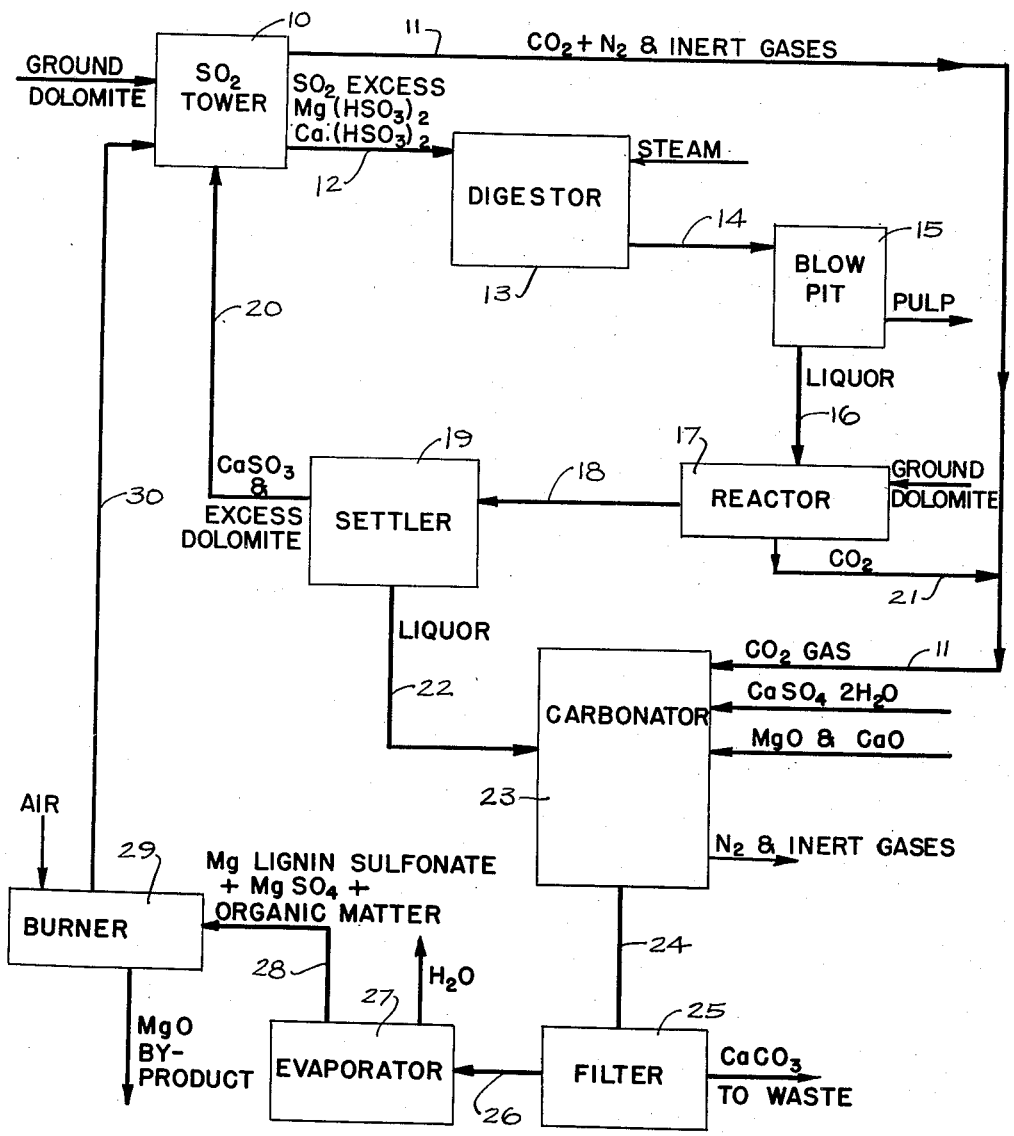
INVENTOR
GEORGE L. CUNNINGHAM
BY
Semmes, Keegin, Robinson and Semmes
ATTORNEYS Patented July 7, 1953

2,644,748

UNITED STATES PATENT OFFICE 2,644,748

SULFITE WASTE TREATMENT PROCESS

George L. Cunningham, Brooklyn, N. Y., assignor, by mesne assignments, to Chempatents, Inc., New York, N. Y., a corporation of Delaware Application November 4, 1946, Serial No. 707,707

6 Claims. (Cl. 92—2)

The present invention relates to improvements in the processing of wood pulp employed in paper manufacture, and has particular reference to an improved process for the manufacture of sulfite pulp, which process effects substantial operating economies by the elimination of sulfite liquor residues ordinarily discharged to waste.

The manufacture of paper pulp by the digestion of wood with sulfite digesting liquor has always involved excessive overhead costs due to substantial loss of starting materials as end product waste. Normally little or no attempt is made by the industry to recover the constituents of sulfite waste liquor, which contain large amounts of lignin, reduced sugars, organic sulfonates and inorganic compounds. The waste liquors usually are disposed of by discharge into a stream or other body of water. This practice is harmful in that the waste liquors rapidly exhaust the oxygen content of disposal streams, resulting in the destruction of fish and marine animal life. Moreover, decomposition of the waste is accompanied by the generation of objectionable odors and the formation of scums on the water.

As a result of civic regulations against disposal of sulfite waste, considerable experiment has been directed to the forming of saleable byproducts from sulfite waste liquors with the double purpose of reducing the overhead cost of the process, and the elimination of the public nuisance resulting from usual methods of waste disposal. One suggested expedient embodies the double precipitation of the sulfur constituents of the waste liquors with active lime, first precipitating calcium sulfite from the solution, and then calcium lignin sulfonate. The calcium sulfite may be re-employed as a starting material in the pulp digesting mill and the lignin sulfonates may be employed as fuel or in the manufacture of by-products. The thus cleansed mother liquor then contains about 20% to 40% of the reducible waste content, and is sluiced to a disposal stream.

This process is uneconomical due to the enormous amounts of calcium lignin sulfonates formed, resulting in the loss of alkaline earth metal starting materials employed to form the sulfite. Further, the sulfur dioxide constituent of the lignin sulfonates is not recovered. Thus, only a small proportion of sulfite initially employed, is available for reuse in the pulp digesting process.

It has further been suggested that waste sulfite liquors may be disposed of by evaporation of the liquid component. This is impractical, because of the prohibitive overhead cost due to deterioration of the evaporating apparatus employed, from formation of calcium scale. Substitution of an ion which is non-scaling for the calcium ion employed in the pulp digesting process may reduce the evaporator scaling problem, but once again, the cost of this substitution renders the process economically non-competitive. For example, the use of magnesium has been suggested, but it is well known that a magnesium ore such as an oxide, free from the calcium normally found with magnesium ores, is a high grade specialty product, and thus prohibitive from the standpoint of cost.

It is an object of the present invention to provide a new, inexpensive method of making pulp for the manufacture of paper.

More specifically, it is an object of the invention to provide a new method of manufacture of paper pulp which eliminates the formation of objectionable sulfite waste liquors presenting a disposal problem.

A further object is to provide a novel method of pulp manufacture wherein a maximum of normally residual by-products are reconverted easily to starting materials for reuse in the pulp digesting phase, thereby materially reducing the overhead costs of pulp manufacture.

A further object is to provide an improved sulfite pulp digesting process employing inexpensive starting materials which are cleansed of scale forming materials during the operation, permitting maximum reconversion of the constituents employed to compounds capable of reuse without resorting to additional expensive material recovery operations.

A further object is to provide improvements in known sulfite pulp digesting operations without necessitating expensive procedural or apparatus changes.

A further object is to provide a novel sulfite pulp digesting process producing a minimum of waste solids presenting a disposal problem, ease of fluid evaporation from the waste liquor, and wherein a maximum of organic residues are recovered from the waste liquor with no compound decomposition.

Still a further object is to provide a novel sulfite pulp digesting process wherein the compounds employed may be obtained from an inexpensive source, any calcium present being removed during the process.

Other objects and advantages of the invention will be apparent from the following specification and drawings, wherein Figure 1 is a flow diagram of a paper pulp digesting system embodying the improvements of the invention.

In its broadest aspect, the invention contemplates a process for the manufacture of paper pulp wherein the sulfite pulp digesting step is carried out in the presence of calcium, in addition to alkali metal and alkaline earth metal ions other than calcium, and wherein the calcium is removed from the sulfite waste liquors after the pulp digesting step to provide a calcium free sulfite waste liquor. The waste liquor then may be further processed to regenerate compounds capable of use as starting materials, and to form valuable by-products. In the cheaper commercial sources of alkaline earth metal and alkali metal starting materials such as naturally occurring ores, these materials are usually found in association with substantial amounts of calcium. For economic reasons, the use of these cheap, readily available ores is mandatory.

The presence of calcium in the sulfite waste liquor ordinarily seriously aggravates the sulfite waste disposal problem by causing undesirable scaling of evaporating apparatus. The present invention has the advantage of eliminating the deleterious effects of calcium on sulfite waste disposal apparatus.

To carry out the invention, an alkali metal or alkali earth metal compound is mixed with a liquid such as water and the mixture treated with sulfur dioxide or any substance which will form or release a sulfite radical to form an alkali metal or alkali earth metal sulfite. The sulfite liquor then may comprise calcium sulfite and another or other alkali earth metal or alkali metal sulfites such as magnesium sulfite, and their acid sulfites, plus excess sulfur dioxide dissolved in the liquor. The sulfite liquor is then employed in the digestion of the wood chips. The pulp is separated from the sulfite liquor in a blow pit and treated in the usual manner for use in the manufacture of paper. All of this is accomplished in apparatus and methods which are standard known practice.

After separation from the wood pulp, the sulfite waste liquor is cleansed of calcium ion and the mother liquor treated to convert the remaining sulfite to the constituent alkali metal or alkaline earth metal oxide and sulfur dioxide compounds. Part of the calcium content is separated from the sulfite liquor as calcium sulfite and is returned to the digesting tower as a starting material. The remaining calcium is converted to an insoluble compound and removed from the sulfite liquor, for disposal to waste. Organic matter present is filtered from the mother liquor and may be employed economically as fuel. The residue of the sulfite waste liquor is then entirely free from objectionable organic or inorganic constituents and may be employed as a cheap road binding material or further reduced and processed to form other valuable by-products.

The starting materials employed may comprise alkali earth metals such as magnesium and calcium or complexes thereof found in nature, usually in the form of oxides and carbonates, or alkali metal compounds including as examples those of sodium, potassium and ammonia or complexes thereof. These compounds are usually contaminated with calcium compounds as found in the natural state.

The ion other than calcium employed in forming the sulfite digesting solution should react easily to form sulfites in solution, and decompose in the presence of heat at relatively low temperatures into its sulfur and alkaline metal or alkaline earth metal components, usually as sulfur dioxide and the metal or alkaline earth metal oxide or respective equivalents thereof, facilitating reuse of these compounds in the pulp digesting step. The sulfite other than calcium sulfite should have a molal solubility higher than that of calcium sulfite, in order that a selective precipitation of these compounds may be carried out expeditiously and without contamination. The ion other than calcium should form soluble sulfites, sulfonates and sulfates in solution which are more soluble at elevated temperatures, so that the solution may be evaporated down without scaling of equipment.

A preferred compound for use in carrying out the invention comprises a magnesium-calcium carbonate complex having the general formula $MgCa(CO_3)_2$ commonly referred to as "dolomite." Dolomite is an easily available and economical source of magnesium and calcium for use in forming the sulfite digesting liquor, and provides a valuable end product of pure magnesium oxide, uncontaminated by calcium.

The sulfur constituent of the sulfite digesting liquor comprises preferably sulfur dioxide. While a pure or concentrated form of sulfur dioxide is preferred for reasons of economy, a commercial grade of sulfur dioxide in relatively dilute form, may be used. However, it is to be understood that any compound which will yield a sulfite radical to the alkali earth metal or alkali metal ion in solution, may be employed. Sulfites themselves may be employed, but this is not accepted practice because of the expense involved.

The method of the invention will now be described in detail in connection with the flow diagram shown in the drawings, it being understood that the concept and scope of the invention is not to be limited thereby, and that the method disclosed may be employed with any apparatus or combinations thereof in any sequence of steps in accordance with the invention and the understanding of one skilled in the art.

In the drawing, the numeral 10 refers to an absorption tower which is charged with, for example, dolomite preferably ground to a fine mesh to expedite speed and completeness of reaction. The dolomite is mixed with a liquid such as water and the mixture charged with sulfur dioxide, preferably in excess of the amount necessary for reaction requirements, under known conditions of temperature and pressure, usually one atmosphere of total gases present including $SO_2$. A mixture of magnesium and calcium sulfites and acid sulfites is formed with simultaneous release of carbon dioxide due to displacement of the carbonate radical, along with residual inert gases such as nitrogen. An excess of $SO_2$ may be added to the liquor at this point if desired, to ensure completeness of reaction. The carbon dioxide is employed later in the process and for this purpose is drawn off through a conduit 11.

The sulfite digesting liquor is passed through a conduit 12 to a digester 13 where the wood chips are digested in the presence of steam, to form pulp. The pulp is passed through a conduit 14 to a blow pit 15 where the waste sulfite digesting liquors are separated therefrom, all in accordance with known practice. At this point, the sulfite waste liquor may be analyzed as follows:

*Waste sulfite liquor*

| Ingredient | Gms. per liter of liquor |
|---|---|
| Total solids | 115.00 |
| Ash | 9.64 |
| Total sulfur | 7.83 |
| Sulfur as $SO_3$ | 0.76 |

For every ton (2202 lbs.) of dry fibre, the waste-sulfite liquor contains: 1320 lbs. lignin; 441 lbs. $SO_2$ combined with lignin; 198 lbs. CaO combined with lignosulfonic acids; 717 lbs. carbohydrates; 33 lbs. proteins; and 66 lbs. fats and resins.

The sulfite waste liquor is passed through a conduit 16 to a reaction chamber 17, wherein ground dolomite is added to the sulfite waste liquor in amount sufficient to adjust the hydrogen ion concentration thereof to approaching neutrality, causing precipitation of a portion of the calcium ion present as calcium sulfite. It is preferred to employ powdered dolomite, to accelerate the reaction. While not necessary, it is advantageous to add dolomite in excess of the amount necessary to adjust the sulfite liquor pH to neutral, in order to ensure that this condition is achieved. An excess of dolomite also aids in settling out the sulfite formed. Carbon dioxide released during the reaction is passed through a conduit 21 to the conduit 11, for later use. The mass is transferred through a conduit 18 to a settling chamber 19 wherein the calcium sulfite and excess dolomite are settled out and returned through a conduit 20 to the mixing tower 10 for reincorporation in the digesting liquor as a starting material.

The sulfite liquor, partially cleansed of calcium, is further treated to strip completely all calcium from the solution. To this end, the sulfite liquor is passed through a conduit 22 to a carbonating chamber 23. A mixture of MgO and CaO, known to the trade as "burned dolomite," is added to the sulfite liquor in such amount that the moles of magnesium ions present exceed the total calcium ions, preferably in the amount of 10% of the total Ca and Mg ions present.

The slurry is now carbonated by injection therein of carbon dioxide from the several sources thereof supplying the conduit 11, obtained as a by-product of the operations above mentioned. A sufficient amount of carbon dioxide must be provided to carbonate completely the calcium ions present in the waste liquor, and preferably slightly in excess of the molal equivalent to ensure completeness of reaction. Insoluble calcium carbonate is precipitated from solution, stripping the sulfite waste liquor of all calcium remaining therein. The addition of the dolomite and the burned dolomite to the sulfite waste liquor adjusts the pH of the liquor to a value sufficiently high that calcium carbonate is precipitated during the carbonation. The addition of the excess of dolomite mentioned above is also of value in aiding in the precipitation of calcium carbonate and the optimum precipitation of the calcium carbonate may be obtained if the waste liquor is adjusted to a pH in the range of about 9.0 to 9.3.

Where the system is subject to the loss of sulfur dioxide during the process, it is desirable to add a sulfate radical to the slurry in amounts sufficient to replace this loss. This may be accomplished conveniently by adding a sulfate such as $CaSO_4$ or $CaSO_4.2H_2O$ (gypsum) to the slurry with the burned dolomite. In such case, the increase in concentration of the calcium ion must be compensated by the addition of more burned dolomite to provide the desired molal balance of Mg and Ca ions in the slurry as set forth above. If there is no loss of sulfur during the operation, this step may be omitted.

The slurry is passed through a conduit 24 to suitable filtering apparatus 25 where the calcium carbonate constituent is filtered off from the sulfite liquor for use as a by-product or as unobjectionable waste. The sulfite liquor now contains magnesium sulfite and/or sulfate, magnesium lignin sulfonate, reduced organic sugars and other organic materials. The sulfite liquor is passed through a conduit 26 to an evaporator 27, and excess liquid content of the waste liquor reduced by evaporation without scale damage to the apparatus employed, due to the freedom of the solution from calcium ions.

The sulfite liquor may then be filtered again to remove organic matter. Preferably, the concentrated liquor is passed through a conduit 28 to a burner 29 where it is dried down and burned to provide a source of heat, and to cause the magnesium sulfate and magnesium lignin sulfonate to decompose. The decomposition products of the liquor comprise a very high grade calcium free magnesium oxide, of value as a premium grade by-product, and sulfur dioxide in sufficient amount or provide all of the sulfur dioxide necessary for carrying out initial formation of the sulfite digesting liquor in the absorption tower 10. Carbon dioxide also is evolved in the burning step and is carried to the tower 10 through a conduit 30. The carbon dioxide passes on through the tower 10, augmenting the amount of carbon dioxide evolved from the dolomite upon reaction with the sulfur dioxide constituent and passes to the conduit 11 and thence to the carbonation step previously described.

The heavy liquor residue resulting from partial evaporation of excess liquid content may be employed directly in the manufacture of by-products instead of being burned to regenerate the starting materials. In such case, the liquor solution may be treated with sodium carbonate to precipitate a pure magnesium carbonate by-product. This product is filtered out of the liquor and the magnesium lignin sulfonate remaining may be heated under known conditions to produce the product vanillin, or it can be converted into dyestuffs, plastics, pharmaceuticals and desirable intermediate products.

Again, the magnesium lignin sulfonate can be treated with ammonia and carbon dioxide to cause precipitation of magnesium carbonate and the ammonium lignin sulfonate employed as a fertilizer base.

Organic matter residues may be burned to produce excess heat, or may be fermented to produce alcohols and yeast. It has been found economically profitable to treat the cleansed organic residues with certain known types of microorganisms to produce methane gas, useful as a fuel.

It will be observed that the outstanding advantages of the present invention reside in the effecting of substantial economies in known sulfite pulp digesting processes, the elimination of objectionable waste products, and the provision of valuable by-products. The advantages of the invention may be obtained in sulfite treatment processes currently in use with a minimum of disarrangement of established procedure and apparatus.

While the invention has been described in detail with reference to specific materials and procedures, it is to be understood that the inventive concept is not to be limited thereby save as defined in the following claims.

I claim:

1. A process for the recovery of magnesia from the waste liquor from the digestion of cellulosic fibers with calcium and magnesium bisulphite solutions comprising the steps of neutralizing the bisulphite waste liquor from the digestion of the cellulosic fibrous material with a magnesium containing neutralizing agent to precipitate calcium sulfite therefrom and form a liquor rich in magnesium, further alkalizing the magnesium-rich solution with a magnesium oxide containing alkalizing agent, carbonating the magnesium-rich solution with carbon dioxide to precipitate calcium remaining therein as calcium carbonate, separating a substantially calcium free solution of magnesium salts, and concentrating and igniting the calcium free solution to form magnesia.

2. A process for the preparation of substantially calcium-free magnesia from the waste liquor from the digestion of cellulosic fibrous materials with calcium and magnesium bisulphite solutions comprising adding dolomite to the waste liquor to precipitate calcium sulfite from the liquor, separating the calcium sulfite from the liquor, to form a magnesium-rich liquor, adding burned dolomite to the magnesium-rich liquor, carbonating the magnesium-rich liquor to precipitate calcium remaining in the liquor as calcium carbonate, separating the calcium carbonate from the liquor to form a substantially calcium-free solution of magnesium salts, and concentrating and igniting the calcium-free solution to form magnesia.

3. A process for the preparation of substantially calcium-free solutions of magnesium salts from waste liquors from the digestion of cellulosic fiber materials with calcium and magnesium bisulphite solutions comprising neutralizing the waste liquors by the addition of dolomite to precipitate calcium therefrom as calcium sulphite, separating the precipitate from the liquor to form a liquor rich in magnesium salts, adding burned dolomite to the liquor rich in magnesium, carbonating the thus treated liquor to precipitate calcium remaining therein as calcium carbonate, and separating the precipitated calcium carbonate to form a substantially calcium-free solution of magnesium salts.

4. A process of claim 3, wherein the amount of dolomite added is in excess of that required to adjust the pH of the liquor to neutral.

5. A process for the preparation of substantially calcium-free magnesia from the waste liquor from the digestion of cellulosic fibrous materials with calcium and magnesium bisulphite solutions comprising adding dolomite to the waste liquor to precipitate calcium sulfite from the liquor, separating the calcium sulfite from the liquor, to form a magnesium-rich liquor, adding burned dolomite to the magnesium-rich liquor in an amount whereby the ions of magnesium exceed the ions of calcium by approximately 10% of the total ions present, carbonating the magnesium-rich liquor to precipitate calcium remaining in the liquor as calcium carbonate, separating the calcium carbonate from the liquor to form a substantially calcium-free solution of magnesium salts, and concentrating and igniting the calcium-free solution to form magnesia.

6. In the cyclical method of making substantially calcium-free magnesia and pulp by the digestion of a cellulosic fibrous material in a cooking liquor of magnesium and calcium bisulphites, and separating the pulp therefrom, the steps of neutralizing waste liquor from the digestion by the addition of dolomite to precipitate a portion of the calcium as calcium sulfite, separating the thus formed precipitate from the waste liquor to form a solution rich in magnesium salts, delivering the precipitate to a sulfur dioxide absorption tower for contact with sulfur dioxide to form the corresponding bisulfite, recycling the latter to the digestion step, adding burned dolomite to the solution rich in magnesium salts in an amount whereby the magnesium ions therein exceed the calcium ions, adding calcium sulphate to the solution rich in magnesium to replace sulfur losses from the system, carbonating the solution to precipitate calcium therefrom as calcium carbonate, separating the precipitated calcium carbonate from the solution rich in magnesium salts, form a substantially calcium free solution of to magnesium salts, discarding the precipitated calcium carbonate from the system, concentrating the calcium-free solution, igniting the concentrated solution to liberate sulfur dioxide and form magnesia, recycling the liberated sulfur dioxide to the absorption tower, and introducing an aqueous suspension of dolomite into the absorption tower to replace materials discarded from the system.

GEORGE L. CUNNINGHAM.

References Cited in the file of this patent

UNITED STATES PATENTS

| Number | Name | Date |
| --- | --- | --- |
| Re. 18,268 | Howard | Dec. 1, 1931 |
| 1,042,538 | Ellis | Oct. 29, 1912 |
| 1,273,110 | Mitchell | July 16, 1918 |
| 1,303,176 | Drewsen | May 6, 1919 |
| 1,364,418 | Weiss | Jan. 4, 1921 |
| 1,549,189 | Drewsen | Aug. 11, 1925 |
| 1,606,501 | Bradley | Nov. 9, 1926 |
| 1,723,800 | Michael et al. | Aug. 6, 1929 |
| 1,790,023 | Rothe et al. | Jan. 27, 1931 |
| 1,975,954 | Kippe | Oct. 9, 1934 |
| 1,983,789 | Bradley et al. | Dec. 11, 1934 |
| 2,217,786 | Birt et al. | Oct. 15, 1940 |
| 2,238,456 | Tomlinson | Apr. 15, 1941 |
| 2,381,876 | Carlson | Aug. 14, 1945 |
| 2,519,361 | Evans | Aug. 22, 1950 |

OTHER REFERENCES

Hatch, Paper Trade Journal, March 14, 1946, pp. 54–56.

Schwalbe, Chemical Abstracts, vol. 8, page 245 (1914).